US010045362B2

(12) United States Patent
Falconetti et al.

(10) Patent No.: US 10,045,362 B2
(45) Date of Patent: Aug. 7, 2018

(54) UPLINK BASED SELECTION OF DOWNLINK CONNECTIVITY CONFIGURATION

(71) Applicant: Telefonaktiebolaget LM Ericcson (publ), Stockholm (SE)

(72) Inventors: Laetitia Falconetti, Solna (SE); Mattias Bergström, Stockholm (SE); Torsten Dudda, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 64 days.

(21) Appl. No.: 15/303,767

(22) PCT Filed: Apr. 15, 2014

(86) PCT No.: PCT/EP2014/057649
§ 371 (c)(1),
(2) Date: Oct. 13, 2016

(87) PCT Pub. No.: WO2015/158370
PCT Pub. Date: Oct. 22, 2015

(65) Prior Publication Data
US 2017/0041940 A1   Feb. 9, 2017

(51) Int. Cl.
*H04B 7/00* (2006.01)
*H04W 72/08* (2009.01)
(Continued)

(52) U.S. Cl.
CPC ........... *H04W 72/085* (2013.01); *H04L 5/006* (2013.01); *H04L 5/0094* (2013.01); *H04W 48/20* (2013.01);
(Continued)

(58) Field of Classification Search
CPC ..... H04W 24/02; H04W 24/04; H04W 24/10; H04W 28/16; H04W 28/18
(Continued)

(56) References Cited

U.S. PATENT DOCUMENTS 8,462,705 B2 * 6/2013 Kim ................ H04L 5/001
370/328
9,398,483 B2 * 7/2016 Behravan ............ H04B 7/024
(Continued)

FOREIGN PATENT DOCUMENTS

WO    2010105254 A2    9/2010
WO    2013191636 A1    12/2013

OTHER PUBLICATIONS

Shen, Z., et al., "Dynamic Uplink-Downlink Configuration and Interference Management in TD-LTE", Technology Updates on LTE Advanced, Nov. 1, 2012, pp. 51-59, vol. 50, No. 11, IEEE Communications Magazine, IEEE Service Center, Piscataway, US.
(Continued)

*Primary Examiner* — Dmitry H Levitan
(74) *Attorney, Agent, or Firm* — Sage Patent Group (57) ABSTRACT

Uplink based selection of downlink connectivity configuration A node (110, 120) of a cellular network determines a characteristic of at least one UL channel (112, 122) between a device (10) and the cellular network. Depending on the determined characteristic of the at least one uplink channel (112, 114), the node (110, 120) selects a configuration for a downlink connection for the device (10), e.g., a dual connectivity configuration or a carrier aggregation configuration. Further, the node (110) indicates the selected configuration to the device (10).

31 Claims, 6 Drawing Sheets

(51) Int. Cl.
  *H04L 5/00* (2006.01)
  *H04W 48/20* (2009.01)
  *H04W 72/04* (2009.01)
  *H04W 84/04* (2009.01)

(52) U.S. Cl.
  CPC ..... *H04W 72/042* (2013.01); *H04W 72/0413* (2013.01); *H04W 72/0473* (2013.01); *H04W 72/082* (2013.01); *H04W 84/042* (2013.01)

(58) Field of Classification Search
  USPC ............... 370/310, 328, 329, 431, 433, 437
  See application file for complete search history.

(56) References Cited

U.S. PATENT DOCUMENTS

| | | | | |
|---|---|---|---|---|
| 9,615,295 | B2* | 4/2017 | Kim | H04W 36/0055 |
| 9,730,250 | B2* | 8/2017 | You | H04W 88/04 |
| 2012/0127878 | A1 | 5/2012 | Kim et al. | |
| 2017/0230884 | A1* | 8/2017 | Qin | H04W 36/0083 |

OTHER PUBLICATIONS

3rd Generation Partnership Project, "3rd Generation Partnership Project; Technical Specification Group Radio Access Network; Evolved Universal Terrestrial Radio Access (E-UTRA); Physical layer procedures (Release 12)", Technical Specification, 3GPP TS 36.213 V12.0.0, Dec. 1, 2013, pp. 1-186, 3GPP, France.

3rd Generation Partnership Project, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Technical Specification, 3GPP TS 36.300 V12.1.0, Mar. 1, 2014, pp. 1-209, 3GPP, France.

3rd Generation Partnership Project, "3rd Generation Partnership Project; Technical Specification Group Radio Access Network; Study on Small Cell enhancements for E-UTRA and E-UTRAN; Higher layer aspects (Release 12)", Technical Specification, 3GPP TR 36.842 V12.0.0, Dec. 1, 2013, pp. 1-71, 3GPP, France.

* cited by examiner

UPLINK BASED SELECTION OF DOWNLINK CONNECTIVITY CONFIGURATION

TECHNICAL FIELD

The present invention relates to methods for controlling connectivity of a device to a cellular network and to corresponding devices.

BACKGROUND

In cellular networks, e.g., LTE (Long Term Evolution) networks as specified by 3GPP (3rd Generation Partnership Project), techniques referred to as dual connectivity and carrier aggregation may be used to enhance bandwidth for radio transmissions between the cellular network and a user equipment (UE). Carrier aggregation is for example specified in 3GPP TS 36.300 V12.1.0 (2014-03), and architectures for implementing dual connectivity are discussed in 3GPP TR 36.842 V12.0.0 (2013-12).

In dual connectivity, the UE is simultaneously connected to multiple cells of the cellular network. In this case, respective base stations of the cells, in the LTE technology referred to as eNB, may individually perform scheduling of transmissions on their respective connection to the UE, which are formed on different carriers. In the case of carrier aggregation, the eNB serving the UE may establish its connection to the UE using multiple pairs of downlink (DL) carriers and uplink (UL) carriers.

UL power control for the LTE physical layer is for example described in Section 5.1 of 3GPP TS 36.213 V.12.0.0 (2013-12). This power control is applied for both an uplink data channel referred to as PUSCH (Physical Uplink Shared Channel) and an uplink control channel referred to as PUCCH (Physical Uplink Control Channel). The principles of UL power control generally involve that the transmit power utilized by the UE on an UL channel is set in such a way that a path loss between the UE and the serving eNB is compensated and thereby a given received signal power for this UL channel is ensured at the serving eNB.

For UL transmissions, a power headroom report (PHR) provided by the UEs may be used to perform link adaptation and scheduling. The PHR indicates the power still available at the UE given the resource allocation decided by the eNB at the time of the report. If the PHR indicates that more power is available at the UE and there is data in the buffer, the eNB may perform link adaptation and scheduling to achieve higher throughput, using this additionally available power.

In some scenarios, the UE may experience a very large path loss, e.g., due to being located close to the cell edge or behind some obstacle. This may adversely affect the UL channels, such as the PUCCH or PUSCH. In particular, such transmissions may in some cases not be possible while at the same time complying with a transmit power budget of the UE.

Further, in a dual connectivity scenario where the different eNBs perform individual scheduling on their respective links to the UE, a lack of coordination between these eNBs may result in problems. In particular, at each of the eNBs, the impact of scheduling or link adaptation performed by the other eNB is typically unknown, which means that the PHR alone does not allow for ensuring compliance with the transmit power budget of the UE. Therefore, suboptimal scheduling or link adaptation by the eNBs may adversely affect the UL channels.

In typical scenarios, at least one UL channel is needed to enable efficient DL transmissions. For example, in the case of carrier aggregation a PUCCH may be required for transmission of UL control information, such as scheduling requests or feedback with respect to DL transmissions. In the case of dual connectivity, a PUCCH may be required between the UE and each of the eNBs to which the UE is connected. If such UL channel is suffering from poor quality, the expected increase in performance due to the utilization of carrier aggregation or dual connectivity may not be achieved. Further, in the case of dual connectivity the sharing of the transmit power budget by multiple eNBs may even result in a degradation as compared to a scenario without dual connectivity, i.e., a single connectivity configuration.

Accordingly, there is a need for techniques which allow for efficiently utilizing different connectivity configurations for a connection to a cellular network.

SUMMARY

According to an embodiment of the invention, a method of controlling connectivity of a device to a cellular network is provided. According to the method, a node of the cellular network determines a characteristic of at least one UL channel between the device and the cellular network. Depending on the determined characteristic of the at least one UL channel, the node selects a configuration for a DL connection for the device. Further, the node indicates the selected configuration to the device.

According to a further embodiment of the invention, a node for a cellular network is provided. The node comprises at least one interface with respect to a device with connectivity to the cellular network. Further, the node comprises at least one processor. The at least one processor is configured to determine a characteristic of at least one UL channel between the device and the cellular network. Further, the at least one processor is configured to select, depending on the determined characteristic of the at least one UL channel, a configuration of a DL connection for the device. Further, the at least one processor is configured to indicate the selected configuration to the device.

According to a further embodiment of the invention, a computer program or computer program product is provided, e.g., in the form of a non-transitory storage medium, which comprises program code to be executed by at least one processor of a node of a cellular network. Execution of the program code causes the at least one processor to determine a characteristic of at least one UL channel between the device and the cellular network. Further, execution of the program code causes the at least one processor to select, depending on the determined characteristic of the at least one UL channel, a configuration of a DL connection for the device. Further, execution of the program code causes the at least one processor to indicate the selected configuration to the device.

Details of such embodiments and further embodiments will be apparent from the following detailed description of embodiments.

DETAILED DESCRIPTION OF EMBODIMENTS

In the following, concepts according to embodiments of the invention will be explained in more detail by referring to the accompanying drawings. The illustrated concepts relate to control of connectivity of a device to a cellular network. In the illustrated embodiments, it is assumed that the cellular network is based on the LTE technology as specified by 3GPP. However, it is to be understood that the illustrated concepts could be applied in a corresponding manner to other cellular network technologies, e.g., UMTS (Universal Mobile Telecommunications System), GSM (Global System for Mobile Communications), or CDMA2000. In exemplary implementations as illustrated below, it is assumed that device is a UE, e.g., a mobile phone, smartphone, portable computer, or the like. However, it is to be understood that the illustrated concepts may also be applied to other kinds of devices, e.g., a data modem relay node.

In the concepts as illustrated in the following, a connectivity configuration of the UE is selected depending on UL criteria. In particular, a dual connectivity configuration, in which the UE has a DL and UL connection to a first base station, in the following also referred to as MeNB (Master eNB), and an additional DL and UL connection to a second base station, in the following also referred to as SeNB (Secondary eNB), may be selected depending on the UL criteria. Alternatively or in addition, a carrier aggregation configuration, in which the UE has a DL connection and UL connection based on multiple pairs of DL and UL carriers may be selected depending on the UL criteria. The criteria may be based on a characteristic of at least one UL channel between the UE and the cellular network, e.g., a path loss of such UL channel, a transmit power required for such UL channel, a number of resources required on such UL channel. Further, the selection may also take into account a transmit power budget of the UE, i.e., a limit for a power used for performing UL transmissions. Depending on such UL criteria, which will be explained in further detail below, it can be efficiently decided whether or not the dual connectivity configuration should be applied and/or whether or not the carrier aggregation configuration should be applied or not.

Figure 1:
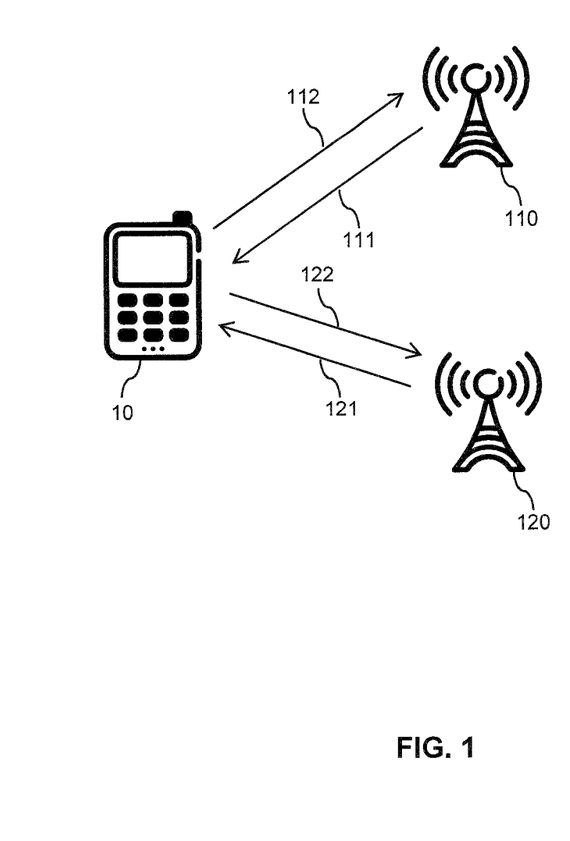
FIG. 1 schematically illustrates an exemplary dual connectivity scenario utilized in connectivity control according to an embodiment of the invention.

FIG. 1 schematically illustrates an exemplary dual connectivity scenario. In particular, FIG. 1 illustrates the UE 10, the MeNB 110, and the SeNB 120. The connection between the UE 10 and the cellular network is based on a dual connectivity configuration. In particular, a DL connection of the UE 10 is based on a first DL channel 111 from the MeNB 110 to the UE 10 and on a second DL channel 121 from the SeNB 120 to the UE 10. Further, an UL connection of the UE 10 is based on a first UL channel 112 from the UE 10 to the MeNB 110 and on a second UL channel 122 from the UE 10 to the SeNB 120.

The first DL channel 111 may for example include a DL control channel, e.g., a PDCCH, and/or a DL data channel, e.g., a PDSCH (Physical Downlink Shared Channel). The first UL channel 112 may for example include a UL control channel, e.g., a PUCCH, and/or a UL data channel, e.g., a PUSCH. Similarly, the second DL channel 121 may for example include a DL control channel, e.g., a PDCCH, and/or a DL data channel, e.g., a PDSCH (Physical Downlink Shared Channel), and the second UL channel 122 may for example include a UL control channel, e.g., a PUCCH, and/or a UL data channel, e.g., a PUSCH. The first DL channel 111 and the second DL channel 121 are provided on different DL carriers, i.e., different frequencies. Similarly, the first UL channel 112 and the second UL channel 122 are provided on different carriers, i.e., different frequencies.

Figure 2:
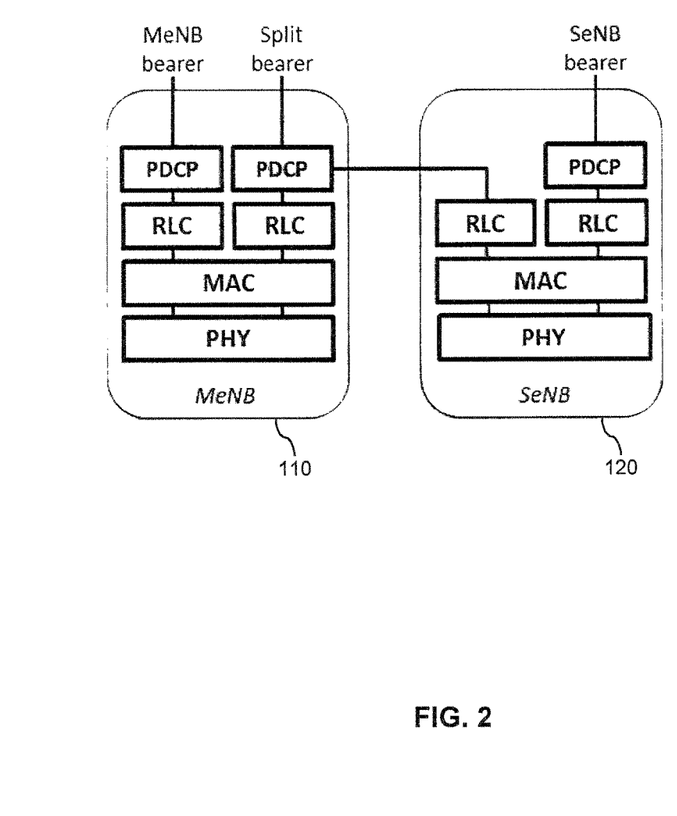
FIG. 2 schematically illustrates a protocol architecture which may be utilized for implementing dual connectivity.

FIG. 2 schematically illustrates an exemplary protocol architecture which may be used for implementing the dual connectivity configuration of FIG. 1. As illustrated, the architecture is based on a protocol stack with a PHY (physical) layer, a MAC (Medium Access Control) layer, an RLC (Radio Link Control) layer, and a PDCP (Packet Data Convergence Protocol) layer. The architecture supports three types of radio bearers between the UE 10 and the cellular network: a MeNB bearer which is served by the MeNB 110 only, a SeNB bearer which is served by the SeNB 120 only, and a split bearer which is served by both the MeNB 110 and the SeNB 120. As illustrated in FIG. 2, for the split bearer, one PDCP layer instance is provided in the MeNB 110, which is coupled to a RLC layer instance in the MeNB 110 and to the MAC layer and PHY layer in the MeNB 110 as well as to a further RLC layer instance in the SeNB 120 and to the MAC layer and PHY layer in the SeNB 120. The concepts as illustrated herein may be applied for all of such radio bearer types.

Each of the above-mentioned types radio bearers may be used for conveying payload data between the cellular network and the UE 10. However, assuming that control functionalities related to Radio Resource Control (RRC) of the UE 10 are implemented in the MeNB 110, RRC control signaling may use only those bearers which are served by the MeNB 110, i.e., to the MeNB bearer and the split bearer.

Figure 3:
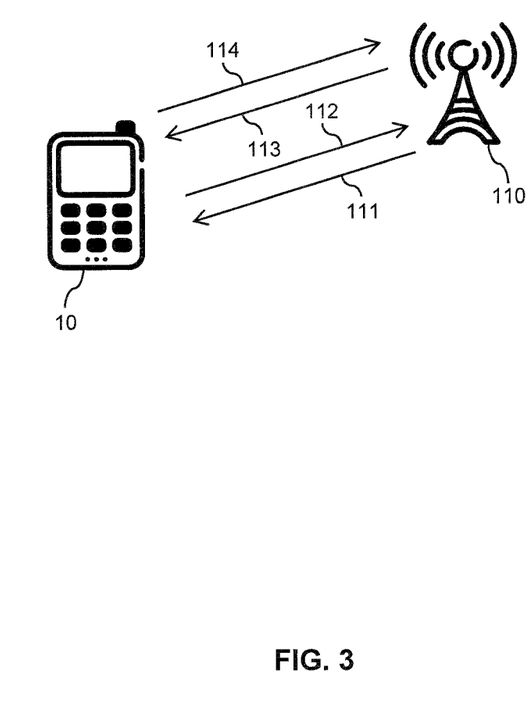
FIG. 3 schematically illustrates an exemplary carrier aggregation scenario utilized in connectivity control according to an embodiment of the invention.

FIG. 3 schematically illustrates an exemplary carrier aggregation scenario. In particular, FIG. 2 illustrates the UE 10 and the eNB 110 serving the UE 10. The connection between the UE 10 and the cellular network is based on multiple pairs of a DL and UL carriers. A first pair of a DL and UL carrier used for establishing the connection between the UE 10 and the eNB 110 is also referred to as PCell (Primary Cell), each further pair of a DL carrier and an UL carrier which are additionally used for the connection between the UE 10 and the eNB 110 is also referred to as SCell (Secondary Cell).

In the scenario of FIG. 3, a DL connection of the UE 10 is based on a first DL channel 111 from the eNB 110 to the UE 10, and on a second DL channel 113 from the eNB 110 to the UE 10. Further, an UL connection of the UE 10 is based on a first UL channel 112 from the UE 10 to the eNB 110 and on a second UL channel 114 from the UE 10 to the eNB 110.

The first DL channel 111 may for example include a DL control channel, e.g., a PDCCH, and/or a DL data channel, e.g., a PDSCH (Physical Downlink Shared Channel). The first UL channel 112 may for example include a UL control channel, e.g., a PUCCH, and/or a UL data channel, e.g., a PUSCH. The second DL channel 121 may for example include a DL control channel, e.g., a PDCCH, and/or a DL data channel, e.g., a PDSCH (Physical Downlink Shared Channel), and the second UL channel 122 may for example include a UL data channel, e.g., a PUSCH, but no UL control channel, such as a PUCCH. The first DL channel 111 and the second DL channel 113 are provided on different DL carriers, i.e., different frequencies. Similarly, the first UL channel 112 and the second UL channel 114 are provided on different carriers, i.e., different frequencies.

Figure 4:
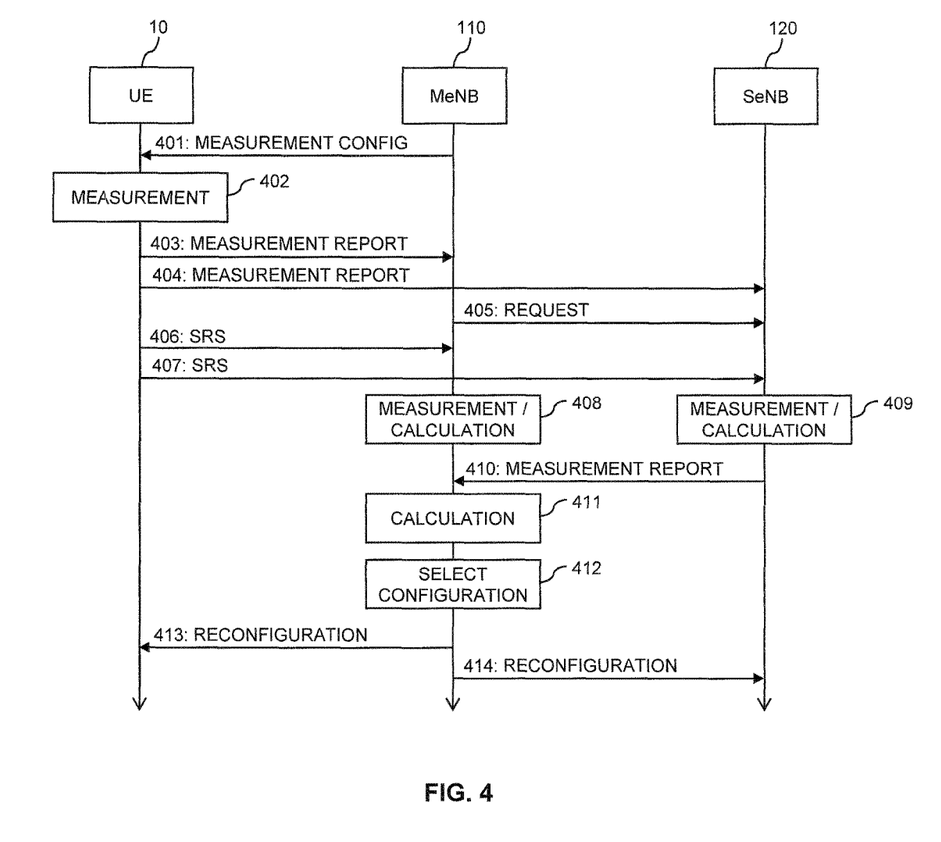
FIG. 4 schematically illustrates exemplary processes according to an embodiment of the invention.

As mentioned above, in the concepts as illustrated herein the selection of a connectivity configuration for the UE 10, e.g., whether or not the dual connectivity configuration of FIG. 1 is used for the UE 10 and/or whether the carrier aggregation configuration of FIG. 3 is used, is based on UL criteria. FIG. 4 shows exemplary connectivity control processes which are based on these concepts.

As illustrated, by sending message 401 the cellular network may configure the UE 10 for measurements with respect to the SeNB 120. The message 401 may also be used for configuring the UE 10 for measurements with respect to the MeNB 110. The message 401 may for example be a RRC message and be sent from the MeNB 110 to the UE 10. In some scenarios, the SeNB 120 may trigger sending of the message 401 by the MeNB 110. Alternatively, the SeNB 120 could send the message 401 to the UE 10.

The measurements configured by message 401 may have the purpose of determining a UL channel quality between the SeNB 120 and the UE 10, e.g., in terms of a RSRP (Reference Signal Received Power), a RSRQ (Reference Signal Received Quality), and/or a CQI (Channel Quality Indicator). In some implementations, the message 401 may also configure the UE 10 to send signals, e.g., SRS (Sounding Reference Signals), to be measured by the MeNB 110 or by the SeNB 120. Further, the message 401 may also be used for configuring the UE 10 with respect to reporting of the measurements.

As illustrated by step 402, the UE 10 may then perform a measurement with respect to the SeNB 120. Further, the UE 10 may perform a measurement with respect to the MeNB 110. Alternatively or in addition, the UE 10 may send signals to be measured by the SeNB 120 and/or MeNB 110, e.g., SRS.

The UE 10 may then send a measurement report 403 to the MeNB 110. This reporting may occur according to a regular schedule or may be event triggered. If the UE 10 is already connected to the SeNB 120, the UE 10 may also send a measurement report 404 to the SeNB 120. Also this reporting may occur according to a regular schedule or may be event triggered.

By sending message 405 to the SeNB 120, the MeNB 110 may request the SeNB 120 to perform measurements with respect to the UE 10 and calculate UL characteristics. The request of message 405 may also include results of measurements obtained by the MeNB 110, e.g., as received in measurement report 403 or based on measurements performed by the MeNB 110 itself. In some scenarios, the SeNB 120 may also be configured to perform such measurements and calculations without a request by the MeNB 110, and in such case message 405 may be omitted.

As illustrated, the UE 10 may then send signals 406, 407, e.g., SRS, to be measured by the MeNB 110 and SeNB 120. This may be accomplished according to the configuration indicated in message 401. The sending of the signals 406, 407 may occur according to a regular schedule or may be event triggered.

As illustrated by step 408, the MeNB 110 may measure the signals 406 sent by the UE 10. Similarly, the SeNB 120 may measure the signals 407 sent out by the UE 10, as illustrated by step 409. The latter measurements may be based on a measurement configuration indicated in message 405.

In step 408, the MeNB 110 may also calculate the path loss to the UE 10 and/or calculate one or more other metrics related to the UL channel 112 between the MeNB 110 and the UE 10, e.g., SINR (Signal to Interference plus Noise Ratio). This is accomplished on the basis of the measurements performed by the MeNB 110 or reported to the MeNB 110. The MeNB 110 may for example calculate required PUCCH and/or PUSCH transmit powers on the UL channel 112 that are necessary to support UL and/or DL transmissions. In these calculations, the PUSCH transmit power may be normalized and expressed per allocated resource block. In particular, the MeNB 110 may calculate the required PUCCH transmit power on the UL channel 112 to support a DL transmission on the DL channel 111, e.g., the PUCCH transmit power required for sending HARQ (Hybrid Automatic Repeat Request) feedback and/or CQI reports. The SeNB 110 may also calculate a number of resource blocks which is expected to be scheduled in on the DL channel 121 and/or a number of resource blocks which is expected to be scheduled in on the UL channel 122.

Similarly, in step 409, the SeNB 120 may also calculate the path loss to the UE 10 and/or calculate one or more other metrics related to the UL channel 122 between the SeNB 120 and the UE 10, e.g., SINR. This is accomplished on the basis of the measurements performed by the SeNB 120 or reported to the SeNB 120. The SeNB 120 may for example calculate required PUCCH and/or PUSCH transmit powers on the UL channel 122 that are necessary to support UL and/or DL transmissions. In these calculations, the PUSCH transmit power may be normalized and expressed per allocated resource block. In particular, the SeNB 120 may calculate the required PUCCH transmit power on the UL channel 122 to support a DL transmission on the DL channel 121, e.g., the PUCCH transmit power required for sending HARQ feedback and/or CQI reports. The SeNB 120 may also calculate a number of resource blocks which is expected to be scheduled in on the DL channel 121 and/or a number of resource blocks which is expected to be scheduled in on the UL channel 122.

The SeNB 120 then sends a measurement report 410 to the MeNB 110 which indicates the results as obtained in step 409, such as required PUCCH and PUSCH transmit power, expected number of resource blocks. It may also include the obtained metrics, such as the path loss of the UL channel 122 from the UE 10 to the SeNB 120, information about expected HARQ transmissions, an expected need for CQI reports, or the like.

In some implementations, the calculation of characteristics and metrics as described to be performed in step 409 by the SeNB 120 may also be performed by the MeNB 110, e.g., on the basis of measurement results reported from the SeNB 120 to the MeNB 110, e.g., in measurement report 410.

At step 411, the MeNB 110 may perform further calculations on the basis of the results from steps 408 and 409. In particular, the MeNB 110 may perform calculations relating the required PUCCH and PUSCH transmit powers for the UL channels 112 and 122 to the transmit power budget of the UE 10. Details of such calculations will be further explained below.

At step 412, the MeNB 110 selects a connectivity configuration for the UE 10. This is accomplished on the basis of the results from step 411, i.e., on the basis of the required PUCCH and PUSCH transmit powers for the UL channels 112 and 122 and the transmit power budget of the UE 10. For example, the MeNB 110 may decide to use the dual connectivity configuration for the UE 10, or to refrain from using the dual connectivity configuration for the UE 10. Depending on the decision, the MeNB 110 may then indicate the selected configuration in message 413 to the UE 10. Similarly, the MeNB 110 may indicate the selected configuration in message 414 to the SeNB 120. By means of the messages 413, 414 the UE 10 and the SeNB 120 may be reconfigured to activate or deactivate the dual connectivity configuration. Further, the messages 413, 414 may also be used to reconfigure the UE 10 and the SeNB 120 with respect to the utilized bearer configuration, e.g., by adding or removing a SeNB bearer or split bearer.

In some implementations, also the SeNB 120 could perform the calculations of step 411 and the decision of step 412, e.g., decide to deactivate or activate the connection between the UE 10 and the SeNB 120 or reconfigure its bearer configuration. For example, the SeNB 120 may obtain information from the MeNB 110 to be used as the basis for this decision, e.g., the results of step 408. If the decision of the SeNB 120 requires a reconfiguration of the UE 10, the SeNB 120 may indicate to the MeNB 110 that and how the UE 10 should be reconfigured. In some scenarios, the SeNB 120 could also directly reconfigure the UE 10, e.g., using the DL channel 121 from the SeNB 120 to the UE 10. In some implementations also some other node than the MeNB 110 and the SeNB 120 could perform the calculations of step 411 and the decision of step 412, e.g., a mobility controller such as an MME (Mobility Management Entity). In such cases, such other node may obtain information from the MeNB 110 and the SeNB 120 to be used as the basis for this decision, e.g., the results of steps 408 and 409.

With respect to the usage of the carrier aggregation configuration as illustrated in FIG. 3 similar processes as illustrated in FIG. 4 may be applied, with the difference that in this case, the measurements and calculations would rather pertain to the UL channel 112 of the PCell and the UL channel 114 of the SCell, and that the decision of step 412 would pertain to whether or not the carrier aggregation configuration, i.e., not only the PCell but also the SCell is utilized or not. Also in this case, the decision may also pertain to the utilized bearer configuration, e.g., to whether the PCell or SCell is used for a certain bearer. Moreover, the decision may also pertain to a reconfiguration of the PCell and SCell assignments. For example, it could be decided to use the DL channel 113 and the UL channel 114 as the PCell (which typically means that the PUCCH would be provided on the UL channel 114), whereas the DL channel 111 and the UL channel 112 are used as the SCell. Further, since in this case as single eNB 110 serves the PCell and SCell on different carriers, typically no interaction between different eNBs is needed, and the measurements and calculations of steps 408, 409, and 411 may be performed by the eNB 110 serving the UE 10.

In the following, exemplary decision rules for the decision on the usage of the dual connectivity configuration will be explained in more detail. In these rules, the following definitions of values will be used:

P_MeNB_PUCCH: Actual or estimated required PUCCH transmission power to one or multiple cells of the MeNB.
P_SeNB_PUCCH: Actual or estimated required PUCCH transmission power to one or multiple cells of the SeNB.
P_MeNB_PUSCH: Actual or estimated required PUSCH transmission power to one or multiple cells of the MeNB.
P_SeNB_PUSCH: Actual or estimated required PUSCH transmission power to one or multiple cells of the SeNB.
P_TMAX: Maximum total transmission power for the UE.
P_MeNB_PUSCH_RB: Estimated required PUSCH transmission power per RB to one or multiple cells of the MeNB.
P_SeNB_PUSCH_RB: Actual or estimated required PUSCH transmission power per RB to one or multiple cells of the SeNB.
_RB_MeNB: Estimated number of RBs that can be allocated by MeNB for PUSCH transmission.
_RB_SeNB: Estimated number of RBs that can be allocated by SeNB for PUSCH transmission.

For optimizing the usage of dual connectivity, e.g., with the aim of improving DL throughput by usage of dual connectivity, it should be taken into account that transmission of UL control channels to both the MeNB and the SeNB with the required power to fully compensate path loss shall be possible. This may be achieved by considering the following exemplary rules.

Rule 1: If P_MeNB_PUCCH+P_SeNB_PUCCH+P_MeNB_PUSCH+P_SeNB_PUSCH≤P_TMAX, and
 →if SeNB is not already in a dual connectivity configuration of the UE, add the SeNB to dual connectivity configuration of the UE.

This rule may ensure that the UE is able to transmit the PUCCH and the PUSCH to both the MeNB and the SeNB.

Rule 2: If P_MeNB_PUCCH+P_SeNB_PUCCH>P_TMAX,
 →don't add the SeNB to dual connectivity configuration of the UE, or if the SeNB is already used in a dual connectivity configuration of the UE, remove the SeNB from the dual connectivity configuration.

This rule may be used to avoid that a dual connectivity configuration is selected in which the UE is not able to handle PUCCH transmission to both the MeNB and the SeNB, irrespectively of any PUSCH transmissions.

Rule 3: If P_MeNB_PUCCH+P_SeNB_PUCCH≤P_TMAX, and
 if P_TMAX−(P_MeNB_PUCCH+P_SeNB_PUCCH)<min(P_MeNB_PUSCH, P_SeNB_PUSCH),
 →don't add SeNB to dual connectivity configuration of the UE, or if the SeNB is already used in a dual connectivity configuration of the UE, remove the SeNB from the dual connectivity configuration.

This rule may be used to avoid that a dual connectivity configuration is selected in which the UE is able to perform PUCCH transmissions to both the MeNB and the SeNB, but PUSCH transmissions to either the MeNB or the SeNB, e.g., for providing DL related feedback such as RLC status reporting or TCP (Transmission Control Protocol) acknowledgements, is not possible.

Rule 4: If P_MeNB_PUCCH+P_SeNB_PUCCH≤P_TMAX, and
 if P_TMAX−(P_MeNB_PUCCH+P_SeNB_PUCCH)>min(P_MeNB_PUSCH, P_SeNB_PUSCH), and
 if P_TMAX−(P_MeNB_PUCCH+P_SeNB_PUCCH)<P_MeNB_PUSCH+P_SeNB_PUSCH,
 →if the SeNB is not already in a dual connectivity configuration of the UE, add SeNB to dual connectivity configuration of the UE, and preferably configure a split bearer based dual connectivity configuration for this UE; for the split-bearer, based on path loss estimates for MeNB and SeNB, preferably select the UL channel with the lowest path loss for PUSCH transmissions of payload traffic (excluding, e.g., RLC control signaling).

In this rule, also the required power per resource block can be used as an alternative or additional criterion for selecting the preferably used UL channel. Further, also the backhaul delay between the MeNB and the SeNB may be used as a criterion for this selection. The higher the delay, the more should PUSCH for UL payload traffic on the MeNB be preferred. The weight of this influence may be traffic specific. Another possibility is to use the expected number of resource blocks to be scheduled in UL in MeNB and in SeNB as a criterion for this selection. An eNB offering the usage of a much larger number of resource blocks (which means low load in this cell) may be preferred.

Further, it may be taken into account that in some scenarios the usage of a dual connectivity configuration may adversely affect UL performance, e.g., in cases where the UE needs to transmit about the same amounts of UL and DL payload traffic. It may then be beneficial to avoid selecting a dual connectivity configuration. This may be achieved by considering the following exemplary rules.

Rule 5: If P_TMAX−(P_MeNB_PUCCH+P_SeNB_PUCCH)<min(P_MeNB_PUSCH, P_SeNB_PUSCH),
→don't add the SeNB to dual connectivity configuration of the UE, or if the SeNB is already used in a dual connectivity configuration of the UE, remove the SeNB from the dual connectivity configuration.

This rule may be used to avoid selecting a dual connectivity configuration in which the UE has not enough power to perform PUSCH transmissions to at least one of the MeNB or SeNB, in addition to the PUCCH transmissions to each of the MeNB and SeNB, which would typically degrade the throughput for PUSCH transmissions.

Rule 6: If P_TMAX−(P_MeNB_PUCCH+P_SeNB_PUCCH)≥P_MeNB_PUSCH, and
if P_TMAX−(P_MeNB_PUCCH+P_SeNB_PUCCH)<P_MeNB_PUSCH+P_SeNB_PUSCH,
→typically don't add the SeNB to dual connectivity configuration of the UE, or if the SeNB is already used in a dual connectivity configuration of the UE, remove the SeNB from the dual connectivity configuration.

In this rule, it may be considered that if there is power available for PUCCH transmissions to the MeNB and the SeNB, and for PUSCH transmissions to the MeNB, but not additionally for PUSCH transmissions to the SeNB, then the UL payload traffic will primarily go through the UL channel to the MeNB (similar to the conventional single connectivity configuration). Thus, it can be expected that the UL performance does not improve by using the dual connectivity configuration. On the other hand, there is a risk that the UL performance may suffer due to uncoordinated link adaptation by the MeNB and the SeNB. It may therefore generally be beneficial to avoid selecting the dual connectivity configuration. However, if the impact on UL performance is estimated to be small, the dual connectivity configuration may nonetheless be selected. For example, in certain scenarios the link adaptation can be expected to works well even in a dual connectivity configuration, e.g., when coordinating link adaptation between the MeNB and the SeNB.

Rule 7: If P_TMAX−(P_MeNB_PUCCH+P_SeNB_PUCCH)≥P_SeNB_PUSCH, and
if P_TMAX−(P_MeNB_PUCCH+P_SeNB_PUCCH)<P_MeNB_PUSCH+P_SeNB_PUSCH,
→if SeNB is not already in a dual connectivity configuration of the UE and the UL channel to the SeNB is expected to provide better performance than the UL channel to the MeNB, add the SeNB to dual connectivity configuration of the UE, and if the SeNB is already in a dual connectivity configuration of the UE and the UL channel to the SeNB is expected to provide worse performance than the UL channel to the MeNB, remove the SeNB from the dual connectivity configuration.

In this rule, it may be considered that if there is power available for PUCCH transmissions to the MeNB and the SeNB, and for PUSCH transmissions to the SeNB, but not additionally for PUSCH transmissions to the MeNB, then the UL payload traffic will primarily go through the UL channel to the SeNB (different from the conventional single connectivity configuration). Thus, it depends on how much better the UL channel to the SeNB is in comparison to the UL channel to the MeNB and how much impact on the UL performance by uncoordinated link adaptation is expected. This may be considered by the following subordinate rules, which aim at guaranteeing that in the dual connectivity configuration the UE experiences a similar UL throughput when performing PUSCH transmissions to the SeNB as in the case of a single connectivity link to the MeNB.

If $\alpha$ (>0) is defined as a factor by which the UL throughput is reduced due to uncoordinated link adaptation in dual connectivity and a conventional single connectivity link to the SeNB normally provides a UL throughput of y, e.g., measured in Mbps, the expected UL throughput when using dual connectivity can be expressed as $y/\alpha$.

Rule 7a: If #_RB_MeNB≤#_RB_SeNB, and
if $\alpha$*P_SeNB_PUSCH_RB≤P_MeNB_PUSCH_RB,
→if SeNB is not already used in a dual connectivity configuration of the UE, add the SeNB to dual connectivity configuration of the UE.

In this case, a scenario is addressed in which the SeNB can provide a resource allocation which is larger than or at least similar to the resource allocation offered by the MeNB, while the required transmit power per RB is reduced by a factor $\alpha$.

Rule 7b: If P_SeNB_PUSCH_RB≤P_MeNB_PUSCH_RB, and
if #_RB_SeNB>$\alpha$*#_RB_MeNB,
→if SeNB is not already used in a dual connectivity configuration of the UE, add the SeNB to dual connectivity configuration of the UE.

In this case, a scenario is addressed in which the SeNB requires a power per RB lower than or at least similar to the one required by MeNB, and the SeNB can provide more than a resource allocation which is more than a times the resource allocation which can be provided by the MeNB.

Rule 7c: If the criteria of rules 7a and 7b are not fulfilled,
→don't add the SeNB to dual connectivity configuration of the UE, or if the SeNB is already used in a dual connectivity configuration of the UE, remove the SeNB from the dual connectivity configuration.

Rule 8: If P_TMAX−(P_MeNB_PUCCH+P_SeNB_PUCCH)≥P_MeNB_PUSCH+P_SeNB_PUSCH,
→if SeNB is not already used in a dual connectivity configuration of the UE, add the SeNB to dual connectivity configuration of the UE.

In this case, a scenario is addressed in which the UE has enough power for PUSCH and PUCCH transmissions to both the MeNB and the SeNB, which means that no degradation, but rather improvement of UL performance can be expected and usage of dual connectivity is therefore desirable.

In the following, exemplary decision rules for the decision on the usage of the carrier aggregation configuration will be explained in more detail. In these rules, the following definitions of values will be used:

P_C1_PUCCH: Actual or estimated required PUCCH transmission power to the cell C1 of the considered eNB.

P_C2_PUCCH: Actual or estimated required PUCCH transmission power to the cell C2 of the considered eNB.
P_C1_PUSCH: Actual or estimated required PUSCH transmission power to the cell C1 of the considered eNB.
P_C2_PUSCH: Actual or estimated required PUSCH transmission power to the cell C2 of the considered eNB.

The exemplary rules as explained in the following specifically aim at optimizing UL performance of the UE by the use of a carrier aggregation configuration, e.g., as illustrated in FIG. 3.

Rule 9: If P_TMAX−P_C1_PUCCH<min(P_C1_PUSCH, P_C2_PUSCH), and
  if P_TMAX−P_C2_PUCCH<min(P_C1_PUSCH, P_C2_PUSCH),
    →don't use a carrier aggregation configuration based on cells C1 and C2 as PCell and SCell of the UE, or if the UE already uses a carrier aggregation configuration based on cells C1 and C2 as PCell and SCell, remove SCell from the carrier aggregation configuration.

By this rule, it can be avoided that a carrier aggregation configuration is selected in which the UE has not enough power to perform PUSCH transmissions on one of the cells C1 and C2, in addition to the PUCCH transmissions. The carrier aggregation configuration is therefore not suitable for transmission of UL payload traffic.

Rule 10a: If P_TMAX−P_C1_PUCCH<min (P_C1_PUSCH, P_C2_PUSCH), and
  if P_TMAX−P_C2_PUCCH<P_C2_PUSCH, and
  if P_TMAX−P_C2_PUCCH≥P_C1_PUSCH,
    →add SCell to carrier aggregation configuration of the UE and configure cell C2 as PCell on which the UE will send PUCCH transmissions, and cell C1 as SCell. PUSCH transmissions with payload traffic should be preferably be scheduled on cell C1.

Rule 10b: If P_TMAX−P_C2_PUCCH<min (P_C1_PUSCH, P_C2_PUSCH), and
  if P_TMAX−P_C1_PUCCH<P_C1_PUSCH, and
  if P_TMAX−P_C1_PUCCH≥P_C2_PUSCH,
    →add SCell to carrier aggregation configuration of the UE and configure cell C1 as PCell on which the UE will send PUCCH transmissions, and cell C2 as SCell. PUSCH transmissions with payload traffic should be preferably be scheduled on cell C2.

By rules 10a and 10b, it can be ensured that a carrier aggregation configuration is selected in which the PCell and SCell assignments are chosen to allow for both PUCCH transmissions and PUSCH transmissions and usage of the cell C1, C2 with the better UL channel quality for the UL payload traffic.

Rule 11a: If P_TMAX−P_C2_PUCCH<P_C1_PUSCH+P_C2_PUSCH, and
  if P_TMAX−P_C1_PUCCH≥P_C1_PUSCH+P_C2_PUSCH,
    →add SCell to carrier aggregation configuration of the UE and configure cell C1 as PCell on which the UE will send PUCCH transmissions, and cell C2 as SCell. PUSCH transmissions with payload traffic may be scheduled on cell C1 and cell C2.

Rule 11b: If (P_TMAX−P_C1_PUCCH<P_C1_PUSCH+P_C2_PUSCH), and
  if (P_TMAX−P_C2_PUCCH≥P_C1_PUSCH+P_C2_PUSCH),
    →add SCell to carrier aggregation configuration of the UE and configure cell C2 as PCell on which the UE will send PUCCH transmissions, and cell C1 as SCell. PUSCH transmissions with payload traffic may be scheduled on cell C1 and cell C2.

By rules 11a and 11b, it can be ensured that a carrier aggregation configuration is selected in which the PCell and SCell assignments are chosen in such a way that the cell which supports both PUCCH and PUSCH transmissions is selected as the PCell.

Rule 12: If (P_TMAX−P_C1_PUCCH≥P_C1_PUSCH+P_C2_PUSCH), or
  if (P_TMAX−P_C2_PUCCH≥P_C1_PUSCH+P_C2_PUSCH), add SCell to carrier aggregation configuration of the UE.

In the case of rule 12, in principle cell C1 or cell C2 can be selected as PCell and data can be scheduled on both cell C1 and cell C2. However, the eNB may consider certain criteria in the selection of the PCell. For instance, the eNB can consider one of the following criteria or a combination of them for selecting which of the cells C1 and C2 should be the PCell: interference level of the cell C1 as compared to the cell C2, load of the cell C1 as compared to the cell C2 (e.g., in terms of resource utilization), an amount/proportion of UEs served by the eNB that support the carrier of cell C1 as compared to amount/proportion of UEs served by the eNB that support the carrier of cell C2, and and/or a required UL transmit power spectral density of cell C1 as compared to cell C2.

It is to be understood that the illustrated processes or parts thereof may be repeated in a regular manner to achieve continuous adaptation of the connectivity configuration of the UE in changing conditions.

Figure 5:
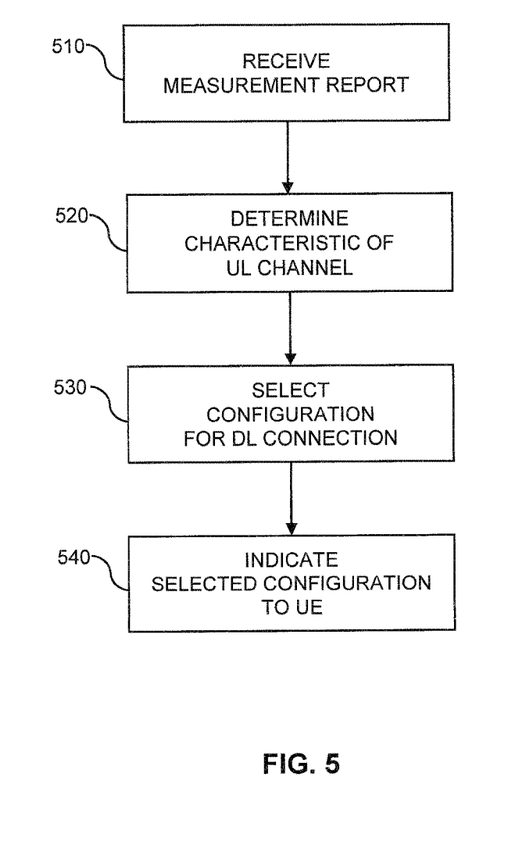
FIG. 5 shows a flowchart for illustrating a method of connectivity control according to an embodiment of the invention.

FIG. 5 shows a flowchart for illustrating a method of controlling connectivity of a device to a cellular network. The method of FIG. 5 may be used for implementing the above-described concepts in a node of the cellular network, e.g., in an eNB, such as the eNB 110 or the eNB 120. The device may for example correspond to a UE, such as the UE 10. If a processor based implementation of the node is used, the steps of the method may be performed by one or more processors of the node. For this purpose, the processor(s) may execute correspondingly configured program code. Further, at least some of the corresponding functionalities may be hardwired in the processor(s).

At step 510, the node may receive a measurement report. Such measurement report may be received from the device, e.g., as in the case of the measurement report 403 in the processes of FIG. 4. Further, such measurement report may be received from another node of the cellular network, such as the measurement reports 404 and 410 in the processes of FIG. 4.

At step 520, the node may determine a characteristic of at least one UL channel between the device and the cellular network. This determination may be based on the measurement report received at step 510. Alternatively or in addition, this determination may be based on a measurement performed by the node.

The UL channel can include a UL control channel, such as a PUCCH, and/or an UL data channel, such as a PUSCH. In some scenarios, the characteristic may be determined with respect to multiple UL channels. For example, such multiple UL channels may include a first UL channel to a first base station and a second UL channel to a second base station in a dual connectivity scenario, e.g., as illustrated in FIG. 1. For example, the first UL channel to the first base station could correspond to the above-mentioned UL channel 112 to the MeNB 110, and the second UL channel to the second base station could correspond to the above-mentioned UL channel 122 to the SeNB 120 as explained in connection with FIG. 1. Alternatively or in addition, such multiple UL channels may include a first UL channel on a first carrier and a second UL channel on a second carrier in a carrier aggregation scenario. For example, the first UL channel could correspond to the above-mentioned UL channel 112 of the PCell, and the second UL channel could correspond to the above-mentioned UL channel 114 of the SCell.

The characteristic of the at least one UL channel may include or be based on a path loss. Further, the characteristic of the at least one UL channel may include or be based on an SINR. Further, the characteristic of the at least one UL channel may include or be based on an estimate of a transmit power required by the device to perform transmissions on the UL channel. Further, the characteristic of the at least one UL channel may include or be based on an amount of resources of the at least one UL channel required by the device.

At step 530, the node selects a configuration for a DL connection for the device. This is accomplished depending on the determined characteristic of the at least one UL channel as determined at step 520. Further the selection of the configuration may be based on a power limit of the device for UL transmissions.

The selection of the configuration for the DL connection may involve selecting between a first DL connectivity configuration, in which the DL connection of the device includes a first DL channel, such as the DL channel 111 in the dual connectivity scenario of FIG. 1 or in the carrier aggregation scenario of FIG. 3, and a second DL connectivity configuration in which the DL connection additionally includes a second DL channel, such as the DL channel 121 in the dual connectivity scenario of FIG. 1 or the DL channel 113 in the carrier aggregation scenario of FIG. 3. The first DL channel is based on a first set of DL radio resources, and the second DL channel is based on a second set of DL radio resources, which means that transmissions on the first DL connection can be scheduled independently from transmissions on the second DL connection. For example, the first DL connection and the second DL connection may be provided on different carriers. This would be the case both in a dual connectivity configuration as explained in connection with FIG. 1 and in a carrier aggregation configuration as explained in connection with FIG. 3. Further, the first DL connection and the second DL connection may also be served by different base stations of the cellular network, which would be the case in a dual connectivity configuration as explained in connection with FIG. 1. In such scenarios, the node may correspond to the base station serving the first DL channel, e.g., to the MeNB 110 of FIG. 1, or may correspond to the base station serving the second DL channel, e.g., to the SeNB 120 of FIG. 1.

The at least one UL channel may for example be utilized for transmission of feedback with respect to transmissions of the second DL channel. Such feedback may for example involve sending HARQ acknowledgements, RLC status reports, CQI reports, or TCP acknowledgements. In addition, the at least one UL channel may also be utilized for transmission of feedback with respect to transmissions of the first DL channel.

Further, depending on the determined characteristic of the at least one UL channel, also a configuration of an UL connection for the device may be selected. For example, in a carrier aggregation scenario as illustrated in FIG. 3, the characteristic of the at least one UL channel may be used to decide whether configuration of an SCell, i.e., usage of a further pair of a DL and UL carrier, is advantageous in view of UL performance for the device. This selection of the configuration for the UL connection may for example involve selecting between a first UL connectivity configuration, in which the UL connection of the device includes a first UL channel, such as the UL channel 112 in the dual connectivity scenario of FIG. 1 or in the carrier aggregation scenario of FIG. 3, and a second UL connectivity configuration in which the UL connection additionally comprises a second UL channel, such as the UL channel 122 in the dual connectivity scenario of FIG. 3 or the UL channel 114 in the carrier aggregation scenario of FIG. 3. Similar to the above-mentioned first and second DL channel, the first UL channel is based on a first set of UL radio resources, and the second UL channel is based on a second set of UL radio resources, which means that transmissions on the first UL connection can be scheduled independently from transmissions on the second UL connection. For example, the first DL connection and the second DL connection may be provided on different carriers.

At step 540, the node indicates the selected configuration to the device, as for example explained in connection with message 413 of FIG. 4. In some scenarios, the node may also indicate the selected configuration to a further node of the cellular network, e.g., to a base station to be used in a dual connectivity configuration, such as explained in connection with message 414 of FIG. 4.

Figure 6:
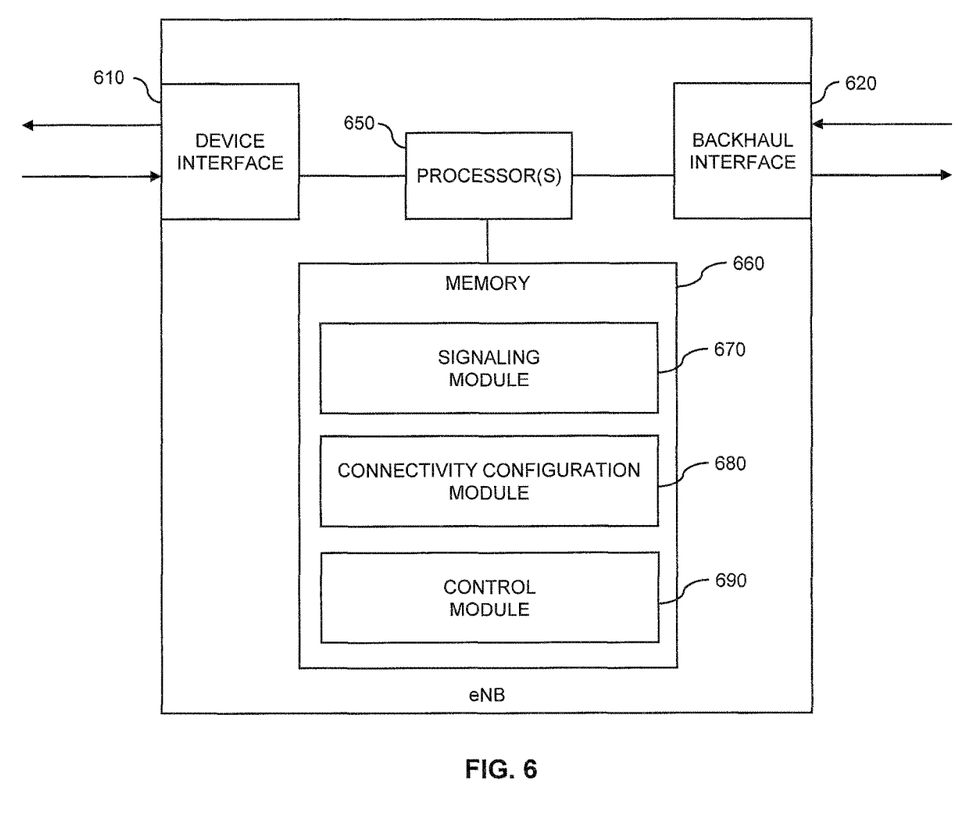
FIG. 6 schematically illustrates structures of a node according to an embodiment of the invention.

FIG. 6 illustrates exemplary structures for implementing a node which operates in accordance with the above-described concepts. For example, the illustrated structures may be used to implement the eNB 110 or the eNB 120.

As illustrated, the node may include a device interface 610 for communication with one or more devices connected to the cellular network, e.g., a radio interface. Further, the node may include a backhaul interface for communication with other nodes of the cellular network. If the node is implemented as an eNB, the device interface 610 may for example implement the LTE Uu radio interface, and the backhaul interface may implement the X2 interface as specified for inter-eNB communication. In dual connectivity scenarios, the backhaul interface may be used for the above-described communication between the MeNB and the SeNB.

Further, the node includes one or more processor(s) 650 coupled to the interfaces 610, 620, and a memory 660 coupled to the processor(s) 650. The memory 660 may include a read-only memory (ROM), e.g., a flash ROM, a random access memory (RAM), e.g., a dynamic RAM (DRAM) or static RAM (SRAM), a mass storage, e.g., a hard disk or solid state disk, or the like. The memory 660 includes suitably configured program code modules to be executed by the processor(s) 650 so as to implement the above-described functionalities of the node, e.g., corresponding to the method steps of FIG. 5. More specifically, the program code modules in the memory 660 may include a signaling module 670 so as to implement the above-described functionalities related to communication with the device or other nodes, e.g., for receiving measurement reports, sending measurement reports, or sending configuration messages. Further, the program code modules in the memory 660 may include a connectivity configuration module 680 so as to implement the above-described functionalities of selecting a connectivity configuration. Still further, the memory 660 may include a control module 990 so as to implement the various control functionalities, e.g., control of the interface 610 depending on the selected connectivity configuration.

It is to be understood that the structures as illustrated in FIG. 6 are merely schematic and that the node may actually include further components which, for the sake of clarity, have not been illustrated, e.g., further interfaces or further processors. Also, it is to be understood that the memory 660 may include further types of program code modules, which have not been illustrated, e.g., program code modules for implementing known functionalities of an eNB. In some implementations, also a computer program may be provided for implementing functionalities of the node, e.g., in the form of a physical medium storing the program code modules to be stored in the memory 660 or by making such program code available for download or streaming.

As can be seen, the concepts as described above may be used for efficiently utilizing different connectivity configurations for a connection to a cellular network. In particular, it can be achieved that a dual connectivity configuration and/or carrier aggregation configuration is only selected if this helps to improve DL or UL performance.

It is to be understood that the examples and embodiments as explained above are merely illustrative and susceptible to various modifications. For example, the concepts could be applied in various kinds of nodes, without limitation to a base station such as an eNB.

Further, it is to be understood that the concepts may also be applied to connectivity configurations combining dual connectivity and carrier aggregation, e.g., in which the MeNB or SeNB uses a carrier aggregation configuration for its connection to the UE.

Further, the illustrated concepts could be used in connection with various types of cellular network technologies, without limitation to the above-mentioned LTE technology. Moreover, it is to be understood that the above concepts may be implemented by using correspondingly designed software to be executed by one or more processors of an existing device or network node, or by using dedicated hardware.

The invention claimed is:

1. A method of controlling connectivity of a device to a cellular network comprising a plurality of nodes and a plurality of devices, the method comprising:
   determining, by at least one of the plurality of nodes, a characteristic of at least one uplink channel between the device and the cellular network;
   selecting a configuration for a downlink connection for the device based on the determined characteristic of the at least one uplink channel, wherein the configuration is selected for at least one of a dual connectivity configuration or carrier aggregation configuration between the device and the cellular network, wherein selecting the configuration for the downlink connection comprises selecting between a first downlink connectivity configuration, in which the downlink connection of the device comprises a first downlink channel based on a first set of downlink radio resources, and a second downlink connectivity configuration, in which the downlink connection additionally comprises a second downlink channel based on a second set of downlink radio resources; and
   indicating the selected configuration to the device.

2. The method of claim 1, wherein the first downlink channel and the second downlink channel are provided on different carriers.

3. The method of claim 1, wherein the first downlink channel and the second downlink channel are served by different base stations of the cellular network.

4. The method of claim 1, wherein the node corresponds to either a base station serving the first downlink channel or a base station serving the second downlink channel.

5. The method of claim 1, wherein the at least one uplink channel is utilized for transmission of feedback with respect to transmissions of the second downlink channel.

6. The method of claim 1, further comprising:
   selecting, by the at least one of the plurality of nodes, a configuration of an uplink connection for the device based on the determined characteristic of the at least one uplink channel; and
   indicating, by the at least one of the plurality of nodes, the selected configuration to the device.

7. The method of claim 6, wherein the selecting of the configuration for the uplink connection comprises selecting between a first uplink connectivity configuration, in which the uplink connection of the device comprises a first uplink channel based on a first set of uplink radio resources, and a second uplink connectivity configuration in which the uplink connection additionally comprises a second uplink channel based on a second set of uplink radio resources.

8. The method claim 1, wherein the at least one uplink channel comprises an uplink control channel and/or an uplink data channel.

9. The method of claim 1, wherein the characteristic of the at least one uplink channel comprises a path loss.

10. The method of claim 1, wherein the characteristic of the at least one uplink channel comprises a signal to interference plus noise ratio.

11. The method of claim 1, wherein the characteristic of the at least one uplink channel comprises an estimate of a transmit power required by the device to perform transmissions on the uplink channel.

12. The method of claim 1, wherein the characteristic of the at least one uplink channel comprises an amount of resources of the at least one uplink channel required by the device.

13. The method of claim 1, further comprising:
   receiving at least one measurement report by one of the plurality of nodes from at least one of the plurality of the devices; and
   determining the characteristic of the at least one uplink channel between the at least one of the plurality of devices and the cellular network based on the at least one measurement report.

14. The method of claim 1, further comprising:
   performing, by at least one of the plurality of nodes, a measurement on a signal transmitted by the device; and
   determining, by at least one of the plurality of nodes, the characteristic of the at least one uplink channel based on the measurement.

15. The method of claim 1, wherein the selecting of the configuration is further based on a power limit of the device for uplink transmissions.

16. A node for a cellular network, the node comprising:
   at least one interface with respect to at least one of a plurality of devices with connectivity to the cellular network;
   at least one processing circuit; and
   memory contain instruction executable by the processing circuit whereby the node is configured to:
   determine a characteristic of at least one uplink channel between the device and the cellular network;
   select a configuration of a downlink connection for the device based on the determined characteristic of the at least one uplink channel, wherein the configuration is selected for at least one of a dual connectivity configuration or carrier aggregation configuration between the device and the cellular network, wherein the configuration of the downlink connection is selected by selecting between a first downlink connectivity configuration, in which the downlink connection of the device comprises a first downlink channel based on a first set of downlink radio resources, and a second downlink connectivity configuration in which the downlink connection additionally comprises a second downlink channel based on a second set of downlink radio resources; and indicate the selected configuration to the device.

17. The node of claim 16, wherein the first downlink channel and the second downlink channel are provided on different carriers.

18. The node of claim 16, wherein the first downlink channel and the second downlink channel are served by different base stations of the cellular network.

19. The node of claim 16, wherein the node corresponds to either a base station serving the first downlink channel or a base station serving the second downlink channel.

20. The node of claim 16, wherein the at least one uplink channel is utilized for transmission of feedback with respect to transmissions of the second downlink channel.

21. The node of claim 16, wherein the instructions are such that the node is configured to:
select a configuration of an uplink connection for the device based on the determined characteristic of the at least one uplink channel; and
indicate the selected configuration to the device.

22. The node of claim 21, wherein the selecting of the configuration for the uplink connection comprises selecting between a first uplink connectivity configuration, in which the uplink connection of the device comprises a first uplink channel based on a first set of uplink radio resources, and a second uplink connectivity configuration in which the uplink connection additionally comprises a second uplink channel based on a second set of uplink radio resources.

23. The node of claim 16, wherein the at least one uplink channel comprises an uplink control channel and/or an uplink data channel.

24. The node of claim 16, wherein the characteristic of the at least one uplink channel comprises a path loss.

25. The node of claim 16, wherein the characteristic of the at least one uplink channel comprises a signal to interference plus noise ratio.

26. The node of claim 16, wherein the characteristic of the at least one uplink channel comprises an estimate of a transmit power required by the device to perform transmissions on the uplink channel.

27. The node of claim 16, wherein the characteristic of the at least one uplink channel comprises an amount of resources of the at least one uplink channel required by the device.

28. The node of claim 16, wherein the instructions are such that the node is configured to:
receive at least one measurement report from at least one of the plurality of devices; and
determine the characteristic of the at least one uplink channel between the at least one of the plurality of devices and the cellular network based on at least one measurement report.

29. The node of claim 16, wherein the instructions are such that the node is configured to:
perform a measurement on a signal transmitted by the device; and
determine the characteristic of the at least one uplink channel based on the measurement.

30. The node of claim 16, wherein the selecting of the configuration is further based on a power limit of the device for uplink transmissions.

31. A computer program product stored in a non-transitory computer readable medium for controlling connectivity of a device to a cellular network, the computer program product comprising software instructions which, when run on one or more processing circuits of a node of the cellular network, causes the node to:
determine a characteristic of at least one uplink channel between the device and the cellular network;
select a configuration for a downlink connection for the device based on the determined characteristic of the at least one uplink channel, wherein the configuration is selected for at least one of a dual connectivity configuration or carrier aggregation configuration between the device and the cellular network, wherein the configuration of the downlink connection is selected by selecting between a first downlink connectivity configuration, in which the downlink connection of the device comprises a first downlink channel based on a first set of downlink radio resources, and a second downlink connectivity configuration, in which the downlink connection additionally comprises a second downlink channel based on a second set of downlink radio resources; and
indicate the selected configuration to the device.

* * * * *